(No Model.)

J. H. RATHMANN.
COMBINED NEEDLE AND CUTTER FOR SEWING BONED HAMS.

No. 273,153. Patented Feb. 27, 1883.

Witnesses.
J. M. Caldwell.
H. Sangster

Inventor.
Johann H. Rathmann.
By James Sangster
Atty.

N. PETERS. Photo-Lithographer, Washington, D. C.

UNITED STATES PATENT OFFICE.

JOHANN H. RATHMANN, OF BUFFALO, NEW YORK.

COMBINED NEEDLE AND CUTTER FOR SEWING BONED HAMS.

SPECIFICATION forming part of Letters Patent No. 273,153, dated February 27, 1883.

Application filed October 3, 1882. (No model.)

*To all whom it may concern:*

Be it known that I, JOHANN H. RATHMANN, a subject of the Emperor of Germany, residing in Buffalo, in the county of Erie and State of New York, have invented certain new and useful Improvements in a Combined Needle and Cutter for Sewing Boned Hams, of which the following is a specification.

The object of this invention is to provide a more rapid and ready means for sewing boned hams or shoulders.

Heretofore such work has been done by an ordinary eye-pointed needle of large size and a separate cutting device, so that every time a piece of the ordinary twine was inserted into the ham in the usual way the needle had to be laid down on the table, after which the knife had to be picked up to cut the twine the proper length for tying and then laid down, and the needle again taken up and put in position for inserting another tying-piece, thereby consuming considerable time when a large amount of work is to be done and a rapid manipulation is required. Furthermore, the operator is liable to cut his fingers during the operation of cutting the twine, as all the work of sewing, cutting, and tying has to be quickly done.

My invention is designed to obviate these objections, as will be fully and clearly hereinafter shown by reference to the drawings, in which—

Figure 1:
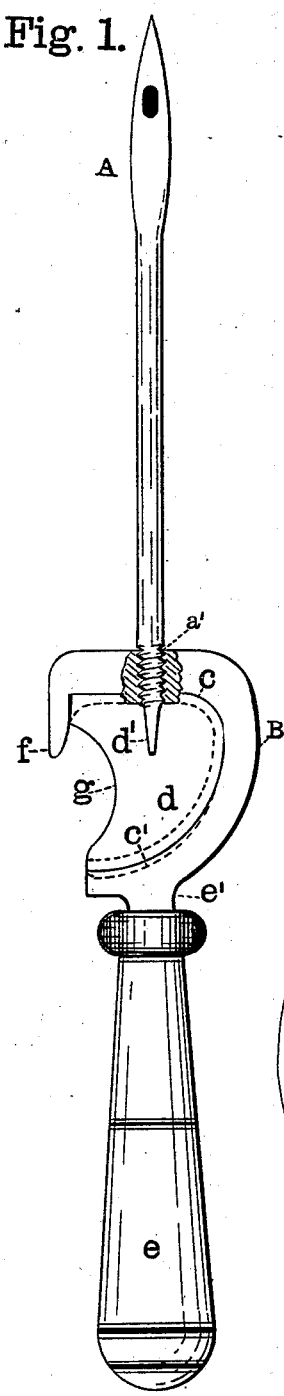
Figure 3:
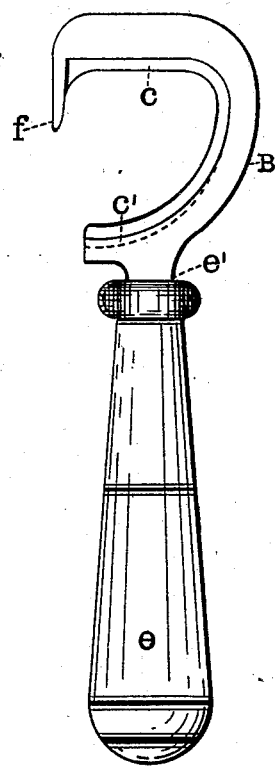
Figure 2:
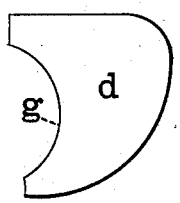
Figure 4:
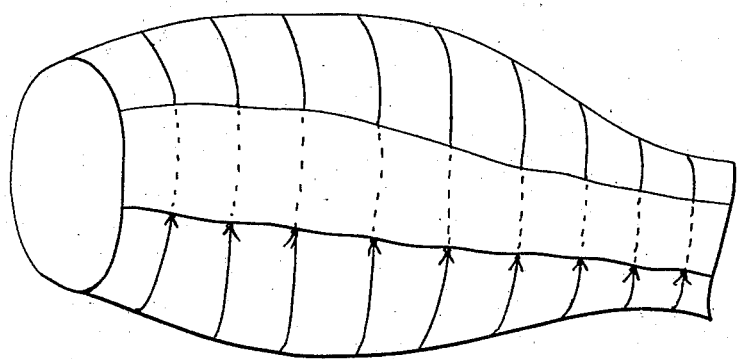

Figure 1 is a side elevation of the device put together ready for use, showing a portion broken away to expose the screw on the end of the needle. Fig. 2 is a detached side view of the knife. Fig. 3 represents a similar view of the needle and knife holding device separate from the needle and knife, and Fig. 4 represents a suitable way of preparing a ham by means of my invention.

A represents the needle, made in the usual form for the purpose. It is provided with a screw portion, $a'$, adapted to screw into the knife-holder B. The knife-holder B is provided with a recess, $c$, which is in the form of a groove, in its lower portion, $c'$. The knife $d$ is formed so as to fit nicely into the groove or recess $c\ c'$, and is securely held in place by the end $d'$ of the needle when in place. (See Fig. 1.) $e$ is the handle by which the device is held while being used. The knife-holder B is fitted or secured into this handle by a shank, $e'$, made in any well-known way. $f$ is a guard for preventing the fingers from being cut while using the device. $g$ is the cutting-edge of the knife $d$. The knife $d$ may be made in one piece with the part B, but it could not be so easily got at to sharpen as it would be by being made removable. The knife is readily taken out by unscrewing the needle, and is easily replaced and secured by putting it into the recess $c\ c'$ and screwing the needle in place.

Instead of the screw $a'$, the needle may be slipped in place and then fastened by a set-screw or other well-known means.

I claim as my invention—

1. A device for sewing boned hams or shoulders, consisting of the handle $e$, knife-holder B, knife $d$, and needle A, for the purposes described.

2. A suitable handle and cutting device, substantially as specified, in combination with a guard, $f$, projecting up in front of the edge of the knife, and a needle, A, for the purposes described.

JOHANN H. RATHMANN.

Witnesses:
JAMES SANGSTER,
J. M. CALDWELL.